United States Patent Office 3,294,011
Patented Dec. 27, 1966

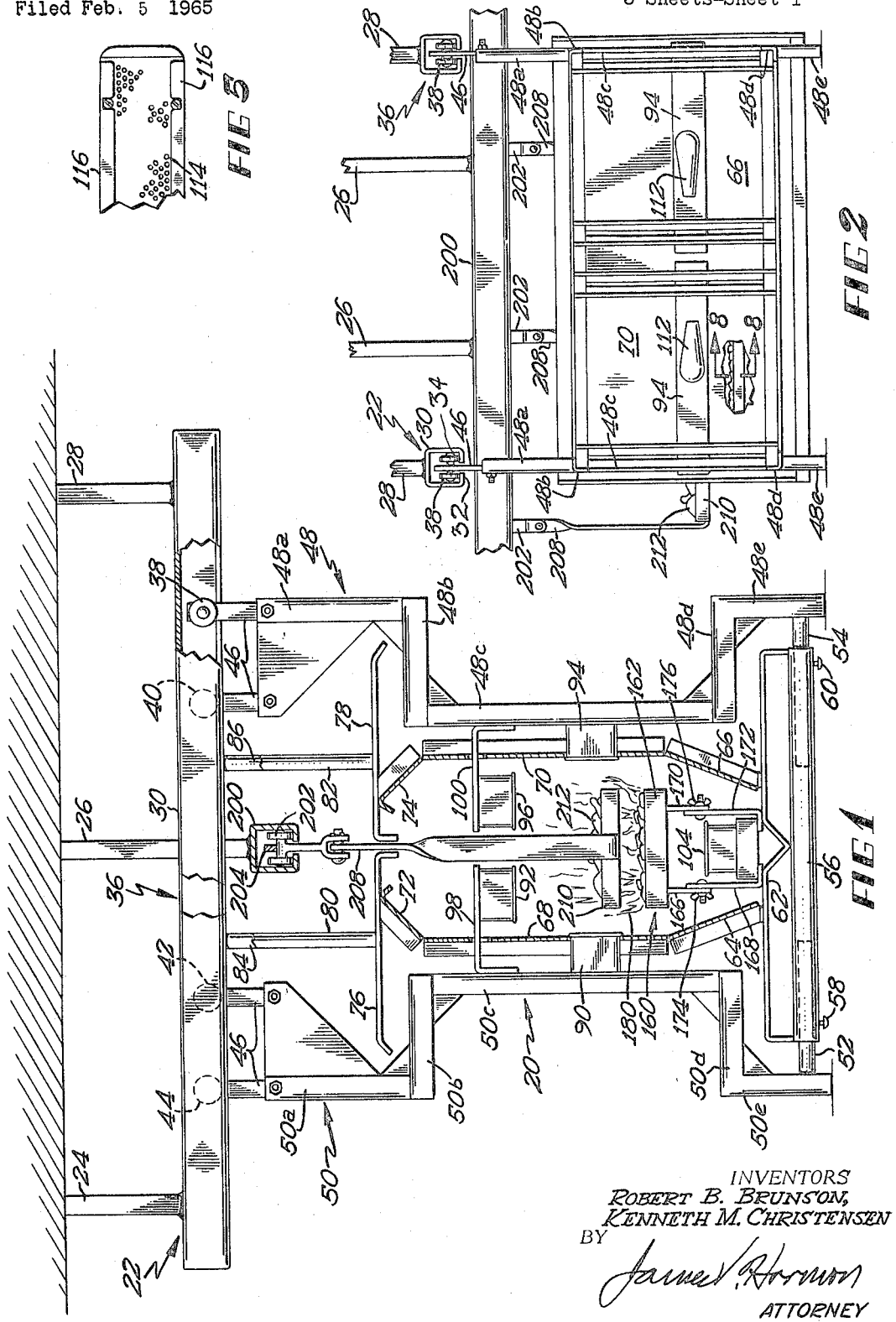

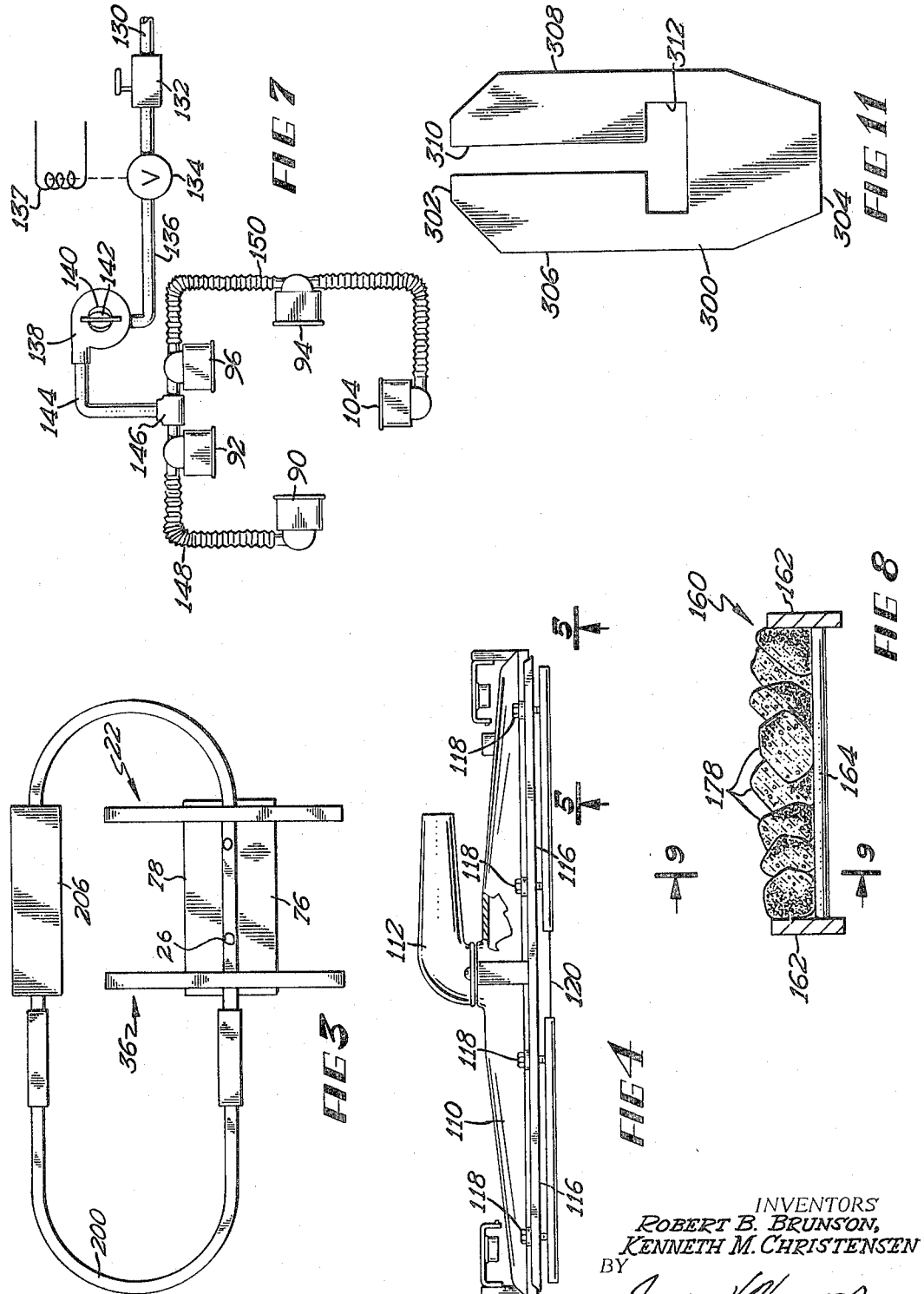

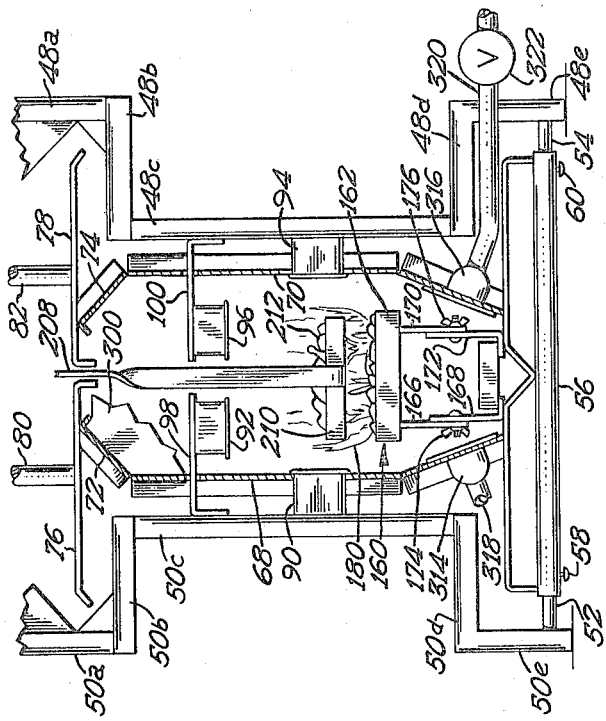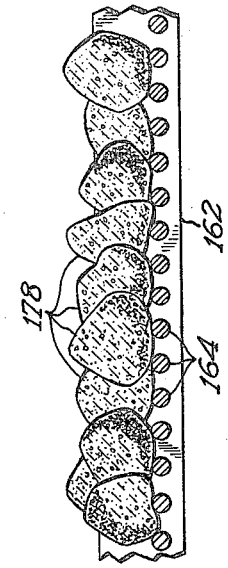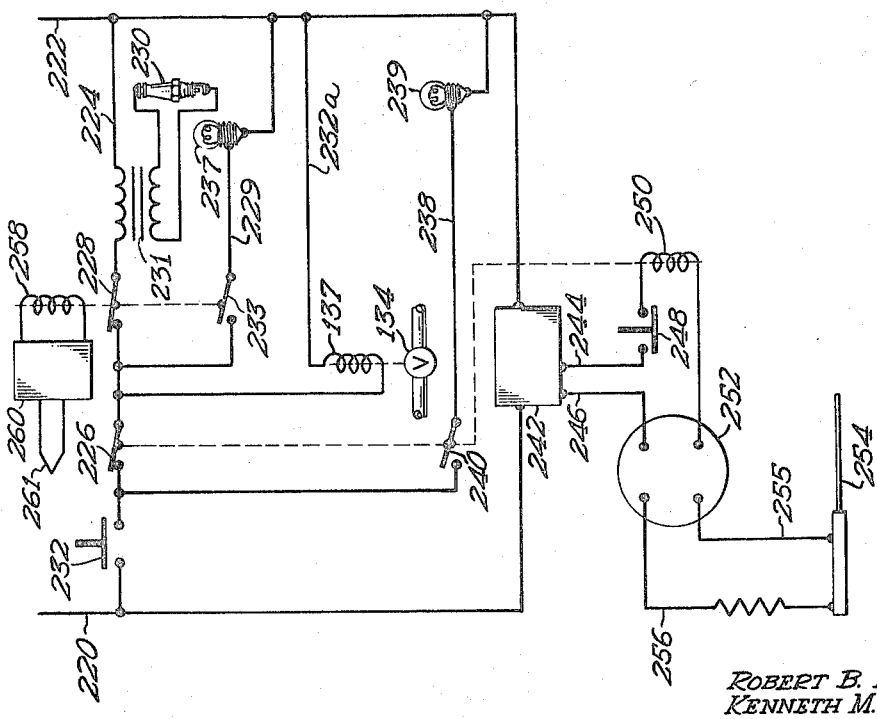
INVENTORS
ROBERT B. BRUNSON,
KENNETH M. CHRISTENSEN
BY James V. Harmon
ATTORNEY

3,294,011
CONTINUOUS ROASTING AND BROILING OVEN
FOR FOOD PRODUCTS
Robert B. Brunson, Medicine Lake, and Kenneth M.
Christensen, Hopkins, Minn., assignors to The Pillsbury Company, Minneapolis, Minn., a corporation of Delaware
Filed Feb. 5, 1965, Ser. No. 430,600
8 Claims. (Cl. 99—443)

The present invention relates to an apparatus for roasting and broiling meat products such as poultry by means of radiant heat alone or in combination with heated water vapor. More particularly, the invention relates to an improved broiling and roasting oven which is filled during operation with the combustion products of drippings from the foods being cooked.

It is well known to employ infra-red rays for baking products such as bread, bakery products and meat. It is common practice in such operations to employ long wave infra-red rays. In this process, the heat is produced by the burning of a fuel such as coal, gas or oil, or by the passage of current through an electrical resistance. This heat is stored in a heat absorbing body such as a ceramic material which in turn radiates heat onto the article being cooked. The cooking process is carried out within an oven for a period of time ranging from about one to four minutes.

Prior baking ovens of which we are aware suffer from certain inherent shortcomings or are otherwise to some extent ineffective in operation. One important defect in previous ovens of the type described is the fact that a substantial part of the conveying apparatus used for carrying articles through the oven is located within the oven itself and is exposed to intense heat which can cause injury to moving parts. Moreover, the conveyor if located within the oven is inaccessible and is therefore difficult to clean effectively.

Another important shortcoming of prior ovens is the fact that they respond slowly to changes made in the temperature at which the oven is to operate. The oven of the present invention is characterized by a relatively fast temperature response time and is capable of being quickly and easily adjusted to provide the proper amount of heat for any of a variety of food products.

Still another shortcoming of many ovens of the general type described is the fact that waste products such as the fat given off by the food being cooked will often accumulate in the oven and provide a site for the collection of dirt and the growth of bacteria which is of course undesirable.

A further shortcoming of commercially available ovens is the fact that no provision is made enhancing the flavor or for modifying the taste of the food products as they are cooked. By contrast, the present invention is capable of imparting a grilled, roasted or smoky taste to the food article being cooked.

Yet another shortcoming of most meat roasting ovens of which we are aware is their tendency under some conditions to dehydrate the surface of the product being cooked.

A still further shortcoming of prior meat roasting ovens is their inability to reliably provide radiant heat energy to all portions of the food article being cooked as well as to effectively regulate the relative amount of heat applied to the top, bottom and sides of the food article.

In view of these and other defects in the prior art, it is one object of the present invention to provide an improved broiling and roasting oven for meat products wherein the moving parts of the conveyer and conveyer supporting structure as well as the parts of the conveyor adapted to transmit motion are reliably protected from exposure to excessive heat.

Yet another object of the invention is the provision of an improved continuous broiling and roasting oven for meat products including a means for quickly and easily regulating the amount of heat to which the food article in the oven is subjected.

Another object of the invention is the provision of an improved broiling and roasting oven for meat products including means for collecting and disposing of waste products such as fat which falls from the food products during the cooking operation.

Still another object of the invention is the provision of an improved broiling and roasting oven for meat products including a means for exposing the food within the oven to the combustion products formed in the burning of drippings which fall from the food products as they are cooked.

Yet another object of the invention is the provision of an improved broiling and roasting oven for food products in which radiant heat can be applied to the article being cooked from all sides thereof and the relative amounts of heat applied to the top, bottom and sides can be effectively regulated.

Yet another object of the present invention is to provide an improved broiling and roasting oven for food products including a means for regulating the moisture loss from the surface of the food articles during the cooking operation.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

FIGURE 1 is an end elevational view, partly in section, of an oven embodying the present invention.

FIGURE 2 is a partial right side elevational view of the oven in accordance with the invention on a reduced scale relative to FIGURE 1.

FIGURE 3 is a plan view of the oven and the conveyor associated with the oven.

FIGURE 4 is a plan view of one of the radiant heaters employed in the oven.

FIGURE 5 is a partial front elevational view taken on line 5—5 of FIGURE 4.

FIGURE 6 is an electrical schematic diagram of the controller used for operating the oven.

FIGURE 7 is a schematic diagram illustrating the gas flow to the radiant burners.

FIGURE 8 is a vertical sectional view taken on line 8—8 of FIGURE 2.

FIGURE 9 is a longitudinal sectional view taken on line 9—9 of FIGURE 8.

FIGURE 10 is an end elevational view of a modified form of oven in accordance with the invention.

FIGURE 11 is an elevational view of a cover for the oven of FIGURE 10.

The present invention is particularly designed for broiling and roasting meat products such as chicken or beef slices. It is capable of producing pan-fried chicken and for broiling chicken to a golden brown color as well as adding a broiled or smoked taste to the exterior.

The construction and operation of the broiling and roasting oven will now be described. The oven indicated generally at 20 is mounted upon a suitable support such as hanger assembly 22, comprising two laterally spaced vertically disposed bars 24 and 28, to the lower end of which is secured a horizontally disposed downwardly opening channel 30. Channel 30 includes horizontally disposed webs 32 and 34 which are spaced slightly from each other at their inward ends. A second support assembly 36 as seen in FIGURE 2 is spaced longitudinally from the assembly 22 and is in all respects similar thereto.

At the right end of each support assembly 22 and 36 as seen in FIGURE 1 are identical sets of wheels designated 38 and 40 respectively. At the left end of each support assembly 22 and 36 as viewed in FIGURE 1 are two identical sets of wheels 42 and 44. The sets within the channel 30 are not shown. Extending downwardly from the wheel sets 38, 40, 42 and 44 of both support assemblies 22 and 36 are identical laterally spaced vertical bars 46, rigidly connected to the bars 46 at the right as seen in FIGURE 1 is an oven wall assembly 48. Rigidly connected to the bars 46 at the left as seen in FIGURE 1 is a left oven wall assembly 50.

The oven wall assembly 48 includes at least two longitudinally spaced vertically disposed members such as an angle iron 48a, a horizontal and centrally extending angle iron 48b at the lower end of each angle iron 48a and a pair of vertically disposed angle irons 48c which extend downwardly from the inward end of each of the members 48b. At the lower end of each member 48c is an outwardly extending angle iron 48d. Each of the latter has secured to it an angle iron 48e which extends downwardly from the lower end thereof.

The oven wall assembly 50 includes longitudinally spaced and aligned members such as angle irons 50a through 50e in the same relative positions as the corresponding members 48a through 48e.

Rigidly connected to the lower end of each of the members 48e and 50e are a pair of centrally extending coaxial posts 52 and 54, one pair at each end of the oven. Telescopically mounted over each pair of the posts 52 and 54 is a slidable connection comprising a tube 56 within which the posts 52 and 54 are normally free to slide. To secure the posts in a selected position within the tube 56 suitable releasable locking means such as set screws 58 and 60 are provided.

Rigidly secured at each end as by welding to the tubes 56 is a sheet metal mounting plate 62. Slidably mounted upon the plate 62 are a pair of laterally spaced upwardly extending and outwardly inclined reflection plates 64 and 66 the surfaces of which are parallel to the longitudinal axis of the oven, i.e., parallel to an axis extending normal to the surface of the paper in FIGURE 1. Extending upwardly from the upper ends of reflectors 64 and 66 and preferably integral therewith is a pair of vertical laterally spaced and longitudinally extending reflectors 68 and 70. Secured to the upward ends of the reflectors 68 and 70 respectively are a pair of opposed upwardly extending and centrally inclined reflectors 72 and 74 respectively. The upward ends of the reflectors 72 and 74 abut the lower surface of horizontally disposed coplanar longitudinally extending spaced reflectors 76 and 78 respectively. These reflectors are in turn suspended at each end from the support assemblies 22 and 36 by means of four suitable posts, 80, 82, 84 and 86 (FIGURE 1).

Supported upon the vertically disposed members 48c and 50c and projecting through suitable openings and preferably stationarily mounted within the reflectors 68 and 70 are heating means such as gas fired burners 90, 92, 94 and 96. The burners 92 and 96 are supported by means of brackets 98 and 100 respectively which are themselves rigidly secured to the members 50c and 48c. As seen in FIGURE 1 the burners 90 and 94 are oriented with their heating surfaces disposed vertically facing the center of the oven, while the burners 92 and 96 are positioned above the article which is to be cooked and are oriented such that their heating surfaces direct heat downwardly. Positioned between the reflectors 64 and 66 is an additional burner 104 oriented with the heating surface thereof in a horizontal plane at the top thereof so that heat produced in the burner is directed upwardly. The burners themselves will now be described in detail with reference to FIGURES 4 and 5.

Each burner comprises a hollow burner housing 110 to which is secured an inlet duct 112 for conducting a combustible material such as a mixture of natural gas and air to the burners. One side of each burner housing is open. To the open side of the burner is secured a porous and chemically inert heat radiating material such as a porous ceramic plate 114. The ceramic plate 114 is secured in position by means of bars 116 which are themselves retained in place by bolts 118. If desired, an additional heat absorbing and radiating means such as a metal screen 120, only a part of which is shown, can be positioned over the ceramic plate 114. It will be understood that a plurality of burners can be employed in longitudinally spaced and aligned relationship to extend the length of the oven as shown for example in FIGURE 2. If a longer oven is desired, an additional burner should be provided in each oven section.

As seen in FIGURE 7, gas is supplied to the oven through a duct 130 which communicates through a shut-off valve 132 with an electrically controlled safety valve 134. The valve 134 is normally closed but is opened by the operation of a solenoid 137. Gas is forced through the valve 134 and duct 136 by means of a blower 138 having an air inlet 140 and a mixing valve 142 which can be suitably positioned to control the amount of air mixed with the gas entering the blower. The blower feeds the gas air mixture through a duct 144 to a coupling 146 and thence to a duct 148 which is connected to both the burners 90 and 92. It also passes into a duct 150 which feeds gas to the burners 94 and 96 and 104. For the purpose of enabling the burners 90 and 94 and reflectors 64–74 to be moved on a horizontal lateral axis, as described herein, the ducts 148 and 150 are preferably formed from a flexible material as clearly shown in FIGURE 7.

Referring again to FIGURES 1, 2 and 3 it will be seen that within the oven is provided a grating 160 including side walls 162 and a grill work at the bottom comprising a plurality of parallel rods 164. The grating is supported by laterally spaced downwardly extending legs 166 and 170 which are secured for vertical sliding movement to a selected position on a pair of vertically disposed laterally spaced bracket arms 168 and 172. The legs 166 and 170 are releasably secured in position by the provision of a pair of bolt and wing nut fasteners 174 and 176. Within the grate above the rods 164 is a chemically inert absorptive heat radiating bed such as a plurality of ceramic bodies 178. The term "absorptive" means that the bodies will collect liquids which drip down from the food products being processed. During operation, the bodies 178 are heated to a high temperature by the burner 104 so that the drippings from the food material being cooked will be immediately ignited causing flames 180. The flames and the smoke caused by the burning of drippings striking the bodies 178 will surround and envelop the food products as they pass through the oven thereby imparting to them a smoky or broiled taste.

As shown in FIGURES 1, 2 and 3 there is provided above the oven a plurality of vertically disposed supports 26 to which is secured a horizontally disposed channel 200 of the usual type employed in an overhead conveyer. Within the channel 200 are a plurality of longitudinally spaced sets of wheels 202 (FIGURE 1) each secured to a drive chain 204. Motion is imparted to chain 204 by a drive means 206 of suitable known construction as can be clearly seen in FIGURE 3. The overhead conveyer channel 200 has the form of an oval endless track.

Extending downwardly from each of the sets of wheels 202 is a hanger 208 some of which project into the oven 20. At the lower end of each of the hangers is a tray 210 for supporting a product to be cooked such as chicken pieces 212. As can be clearly seen in FIGURES 1 and 2, the elevation of each tray 210 is in approximate alignment with the position of the burners 90–94 and is spaced a few inches above the grate 160.

Refer now to FIGURE 6 which shows a typical electrical wiring diagram for controlling the oven in accordance with the invention. Current is supplied from a commercial power line to lines 220 and 222. Wired between the lines 220 and 222 is a conductor 224 including a pair of normally closed switches 226 and 228, an ignition means such as a spark plug 230, transformer 231 and an on-off switch 232. Wired in parallel with the switch 228 by means of conductor 229 is a normally open switch 233 in series with a lamp 237. Also in series with switch 228 is a conductor 232a including the solenoid 137 of FIGURE 7 the latter being connected to the safety valve 134. Wired between the line 220 and switch 226 is a line 238 extending to line 222 having a switch 240 and an indicator lamp 239. Lines 222 and 220 are connected to a power supply 242 the output of which provides current to conductors 244 and 246 through a normally closed temperature sensitive reset switch 248 and in series with a solenoid 250 and a relay 252. The relay 252 is also wired to a temperature sensor such as a thermocouple 254 positioned adjacent one of the burners by conductors 255 and 256. The core of the solenoid 250 is connected to switches 226 and 240. A solenoid 258 is wired to a relay 260 which is connected to a sensor 261. The core of solenoid 258 is connected to switches 228 and 233. The operation of the circuit will now be described.

When the oven burners are to be started, switch 232 is depressed completing a circuit through solenoid 137 and spark plug 230 opening valve 134 and igniting the gas in the burner. The current through coil 250 also opens switch 226 and closes switch 240 when the sensor 254 exceeds a selected temperature. The current through conductors 255 and 256 caused by the heating of probe 254 will maintain current through solenoid 250. When sensor 261 reaches a selected lower temperature then solenoid 258 is energized and opens switch 228 and closes 233. Should heat be removed from either of probes 261 or 254, the current to solenoid 250 will be interrupted. The switch 248 will open at excessive temperatures and is reset if necessary by an operator. To turn the burners off, switch 232 is raised, thereby opening 240 and closing 226.

In the modified form of the invention shown in FIGURES 10 and 11 there is provided at the inlet and outlet end of the oven 20 a cover 300 including a top portion 302, a bottom portion 304, parallel side edges 306 and 308 adapted to fit in alignment with and adjacent to the edges of the reflectors 64 through 74. Extending downwardly from the top of the plate 300 is a vertical slot 310 including a horizontally disposed transverse slot at the lower end thereof in the position corresponding with the position of the tray 210 whereby the tray 210 will be able to enter and leave the oven. The cover 300 serves the function of enclosing the oven and reducing the loss of gases from within the oven. Communicating through the reflectors 64 and 66 are a pair of injection nozzles 314 and 316 to which steam is supplied through ducts 318 and 320. The steam admitted to the oven can be regulated in any suitable manner as by means of a metering valve 322 only one of which is shown. By providing steam to the oven the humidity of the oven can be accurately controlled and the moisture loss from the pieces being cooked can be reliably regulated. Steam also functions to increase the heat content of the oven by increasing the heat capacity of the atmosphere within the oven and thereby reduce cooking time without burning the surface of the parts being cooked.

In a preferred cooking operation, chicken pieces or other meat products are preferably covered prior to cooking with a shortening such as margarine or butter which has been browned by subjecting it to heat. Browning of the margarine can be accomplished by heating the margarine before it is applied until at least part of the solids are precipitated. The solids are then removed, browned by the application of heat and recombined with the liquid. The margarine consisting of recombined solids and liquid is applied to the chicken pieces prior to being placed in the trays 210. Through the use of the invention, chicken parts can be heated to a controlled temperature by burners 90–96 and 104 and means consisting of the bodies 178 is provided for collecting and eliminating the drippings from these parts as they pass through the oven. When a cooking operation is started, the oven wall assemblies 48 and 50 are moved on a lateral axis as required on the supports 22 and 36. The screws 58 and 60 are then tightened.

The invention may also be adapted for use in cooking chicken pieces that have been breaded and placed in pans or open grates. If this procedure is followed, a shortening such as margarine can be sprayed or brushed onto the product after it is coated with a breader mix. After the coating of shortening has been applied, the meat pieces are turned over in the heated shortening to pick up the golden color to assure uniformity in browning.

In another cooking process the chicken is cooked in boiling water and frozen. It is then coated with margarine, placed in trays 210 and passed through the oven of the present invention for a sufficient period of time to brown the outside surface but without thawing the center. It is then refrozen and shipped for storage or sale. When the chicken is to be consumed, it is thawed and warmed in a domestic oven. The process results in products comparable to freshly prepared meat products made in the home by conventional cooking methods.

The boiled and frozen chicken pieces can be seasoned by sprinkling salt over them after the margarine is applied. The pieces are preferably cooked with infrared heat evenly for a period of about five minutes on each side in the oven 20. It was found that only about two to seven percent cook-out loss was encountered in this brief cooking, primarily because the center of the pieces are not thawed during the operation. The resultant product has the appearance of thoroughly charcoal broiled chicken when one examines the surface of the piece. When reheated by the consumer from the frozen state in an oven heated to approximatey 400° F., the resulting product is substantially identical to fully cooked charcoal broiled chicken.

In an alternative procedure, the chicken is pan fried rather than being boiled before freezing. The products that result from both methods are considered to be more juicy and more flavorful than fully cooked chicken reheated from a frozen state.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A grilling and roasting oven for preparing food products for use in combination with an endless overhead track conveyor having a plurality of hangers extending downwardly therefrom, each said hanger having a food supporting tray at the lower end thereof, said oven comprising a pair of spaced apart generally vertically disposed reflective side walls, a plurality of burners therein, said burners comprising a hollow housing having a duct means for conveying an inflammable mixture of gases thereto, a heat absorptive infra-red radiator means mounted across the open front of the burner and a bed of absorptive material disposed within the oven at a level below the level of the trays for receiving the drippings from the trays and for burning the drippings within the oven whereby the food products passing through the oven will be exposed to the flames and oxidation products of their own drippings.

2. Roasting and broiling oven for preparing food products comprising in combination an oven having reflective side walls, said oven being open at each end, conveyor means including an elongated supporting rail mounted vertically from the oven, a plurality of members extending vertically from the conveyor, a tray at the free end of each such member for holding the food product, an absorptive chemically inert heated bed below the said tray and heaters within the oven above the bed for transferring heat directly to the trays and food products therein.

3. The apparatus according to claim 2 wherein a burner is provided below the bed.

4. The apparatus according to claim 2 wherein a selectively operable means is connected to the bed for regulating the vertical position of the bed whereby an operator can place the bed in any of a plurality of vertically spaced selected positions.

5. A roasting and broiling apparatus for food products comprising in combination an oven, a conveyor including an oven, a conveyor including an endless supporting member mounted outside of the oven, vertically disposed support elements mounted on the endless member for movement on a horizontal plane in said oven, said oven including at least a pair of laterally spaced side walls and having an opening at each end, food supporting trays mounted at the ends of said vertically disposed elements, at least a pair of horizontally disposed transversely mounted channels, a pair of spaced apart oven support members extending downwardly from each of the channels, said oven side walls being movable longitudinally of the channels whereby the spacing between the oven side walls can be regulated as required, a plurality of heaters mounted in selected positions between the oven side walls, a bed formed from an inert absorptive material mounted within the oven below the position of said tray, a heater means mounted adjacent to the bed for supplying heat to the bed whereby a part of the heat used to cook the food products is supplied by the heat radiated from the bed and whereby the drippings from the food product are oxidized by contact with the heated bed.

6. The apparatus of claim 5 wherein each of said burners comprises a housing having a heat absorbing body disposed along one side of the housing adapted to radiate heat onto the article being cooked and means for supplying a combustible gas mixture to the burner.

7. The apparatus according to claim 6 wherein selectively operable retaining means are provided for securing the said bed in predetermined and selected position for changing the spacing between the tray and the bed.

8. The apparatus according to claim 5 wherein a releasable locking means is provided for securing the oven side walls in selected positions.

References Cited by the Examiner

UNITED STATES PATENTS

| | | | |
|---|---|---|---|
| 1,398,157 | 11/1921 | Segar | 93—390 X |
| 1,560,220 | 11/1925 | De Matteis | 99—390 X |
| 1,656,181 | 1/1928 | Elbert | 99—390 X |
| 1,667,988 | 5/1928 | Richardson | 99—390 X |
| 2,109,079 | 2/1938 | Zeigler et al. | 99—390 X |
| 2,114,698 | 4/1938 | Babin | 99—390 X |
| 2,331,707 | 10/1943 | Lotter | 99—390 X |
| 2,533,080 | 12/1950 | Alexander | 99—390 X |
| 2,689,517 | 9/1954 | Angelus | 219—388 X |
| 2,720,827 | 10/1955 | Del Francia | 99—444 |
| 2,839,409 | 6/1958 | Matlen | 99—443 X |
| 2,898,846 | 8/1959 | Del Francia | 99—444 X |
| 3,003,409 | 10/1961 | Mills | 99—443 |

FOREIGN PATENTS 1,123,666  6/1956  France.

BILLY J. WILHITE, *Primary Examiner.*

WALTER A. SCHEEL, *Examiner.*